United States Patent
Bingel et al.

(10) Patent No.: US 11,524,790 B2
(45) Date of Patent: Dec. 13, 2022

(54) ENHANCED PITOT TUBE POWER MANAGEMENT SYSTEM AND METHOD

(71) Applicant: Honeywell International Inc., Morris Plains, NJ (US)

(72) Inventors: Thomas J. Bingel, Indian Rocks Beach, FL (US); Deanne Tran Vo, Palm Harbor, FL (US)

(73) Assignee: Honeywell International Inc., Charlotte, NC (US)

( * ) Notice: Subject to any disclaimer, the term of this patent is extended or adjusted under 35 U.S.C. 154(b) by 1027 days.

(21) Appl. No.: 16/107,641

(22) Filed: Aug. 21, 2018

(65) Prior Publication Data

US 2020/0062406 A1 Feb. 27, 2020

(51) Int. Cl.
- *B64D 15/12* (2006.01)
- *B64D 43/02* (2006.01)
- *G01P 5/165* (2006.01)

(52) U.S. Cl.
CPC ............. *B64D 15/12* (2013.01); *B64D 43/02* (2013.01); *G01P 5/165* (2013.01)

(58) Field of Classification Search
CPC ......... B64D 15/12; B64D 43/02; G01P 5/165; G01P 1/006
See application file for complete search history.

(56) References Cited

U.S. PATENT DOCUMENTS

| | | |
|---|---|---|
| 5,464,965 A | 11/1995 | McGregor et al. |
| 6,370,450 B1 | 4/2002 | Kromer et al. |
| 6,414,282 B1 | 7/2002 | Ice et al. |

(Continued)

FOREIGN PATENT DOCUMENTS

| | | |
|---|---|---|
| CN | 107065969 A | 8/2017 |
| CN | 206975451 U | 2/2018 |

(Continued)

OTHER PUBLICATIONS

European Patent Office, "Communication pursuant to Article 94(3) from EP Application No. 19192417.4", from Foreign Counterpart to U.S. Appl. No. 16/107,641, filed Apr. 24, 2020, pp. 1 through 6, Published: EP.

(Continued)

*Primary Examiner* — Nicholas McFall
(74) *Attorney, Agent, or Firm* — Fogg & Powers LLC

(57) ABSTRACT

A system, power management system and method are disclosed. The power management system includes a pitot tube, one or more heating elements disposed in the pitot tube, and one or more power switches, wherein each power switch of the one or more power switches is coupled to a respective heating element and configured to energize or de-energize the respective heating element in response to a control signal. The power management system also includes a temperature detector coupled to the pitot tube and configured to determine a temperature of the pitot tube, and a processor complex coupled to the one or more power switches and the temperature detector and configured to output the control signal to energize or de-energize at least one of the heating elements through a respective at least one of the respective one or more power switches in response to at least the determined temperature of the pitot tube or a detection of a fault.

18 Claims, 3 Drawing Sheets

(56) References Cited

U.S. PATENT DOCUMENTS

| | | | |
|---|---|---|---|
| 7,854,548 B2 | 12/2010 | Sandnas et al. | |
| 2010/0116806 A1 | 5/2010 | Hollingsworth et al. | |
| 2019/0178906 A1* | 6/2019 | Vadada | G01F 1/46 |
| 2019/0382139 A1* | 12/2019 | Shi | B64D 43/02 |
| 2020/0018654 A1* | 1/2020 | Seloff | G01K 1/024 |
| 2020/0025632 A1* | 1/2020 | Winter | G01P 5/165 |
| 2020/0060016 A1* | 2/2020 | Essawy | B64D 43/02 |

FOREIGN PATENT DOCUMENTS

| | | | |
|---|---|---|---|
| EP | 1204012 A1 | 5/2002 | |
| EP | 3076190 A1 | 10/2016 | |

OTHER PUBLICATIONS

"How can a pitot tube freeze when it's heated?", https://aviation.stackexchange.com/questions/24773/how-can-a-pitot-tube-freeze-when-its-heated, Drawn from the Internet on Aug. 20, 2018, pp. 1-4.

European Patent Office, "Extended European Search Report from EP Application No. 19192417.4", from Foreign Counterpart to U.S. Appl. No. 16/107,641, dated Nov. 21, 2019, pp. 1-8, Published: EP.

* cited by examiner

ENHANCED PITOT TUBE POWER MANAGEMENT SYSTEM AND METHOD

BACKGROUND

Air France Flight 447 was a scheduled passenger international flight from Rio de Janeiro, Brazil, to Paris, France, which crashed on 1 Jun. 2009. The Airbus A330, operated by Air France, entered into an aerodynamic stall, from which it did not recover. Consequently, the aircraft fell into the Atlantic Ocean and none of the 228 passengers and crew onboard the aircraft survived. France's Bureau of Enquiry and Analysis (BEA) released its final crash report on 5 Jul. 2012. The report concluded that the aircraft plummeted 38,000 feet and crashed in just three minutes and 30 seconds, because the pilots had temporarily lost vital airspeed information. The BEA's air crash investigators theorized that the aircraft's speed sensors or "pitot tubes" had malfunctioned because they were obstructed by ice crystals formed at high altitude. These malfunctions caused the aircraft's autopilot to disengage, and the aircraft climbed to 38,000 ft. when "the stall warning was triggered and the airplane stalled," according to the report. Unfortunately, the crew failed to react correctly and was unable to recover the aircraft from the stall.

Subsequently, as a result of the accident, government and industry standards related to "pitot tube icing" were revised to require the aircraft manufacturers to replace existing pitot tubes with pitot tubes that were less vulnerable to icing. As such, in order to increase their resistance to icing, pitot tubes with internal heating elements have been employed. However, these heating elements have fixed resistances and tend to run very hot when energized on aircraft in warm environments (e.g., on the ground, during the summertime, within an equatorial region, etc.). Consequently, the failure rate of the existing pitot tubes has increased significantly and their mean-time between failures (MTBF) has been significantly reduced. In this regard, aircraft maintenance and/or out-of-service times have increased substantially because pitot tube replacements typically take up to 24 hours. Furthermore, crew members and maintenance personnel have expressed their concern about the hazard of touching a pitot tube while an aircraft is on the ground (tube temperature exceeding 400 degrees C.).

Therefore, the need exists for a technique that can be utilized to enhance the operational lifetime of the pitot tubes and safety of the personnel involved.

SUMMARY

Embodiments disclosed herein present a power management system and method for monitoring and controlling the power applied to one or more heating elements in a pitot tube utilized, for example, as a speed sensor for a vehicle such as an aircraft.

DRAWINGS

Embodiments of the present disclosure can be more easily understood and further advantages and uses thereof more readily apparent, when considered in view of the description of the preferred embodiments and the following figures in which.

In accordance with common practice, the various described features are not drawn to scale but are drawn to emphasize features relevant to the present disclosure. Reference characters denote like elements throughout the figures and text.

DETAILED DESCRIPTION

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

Figure 1:
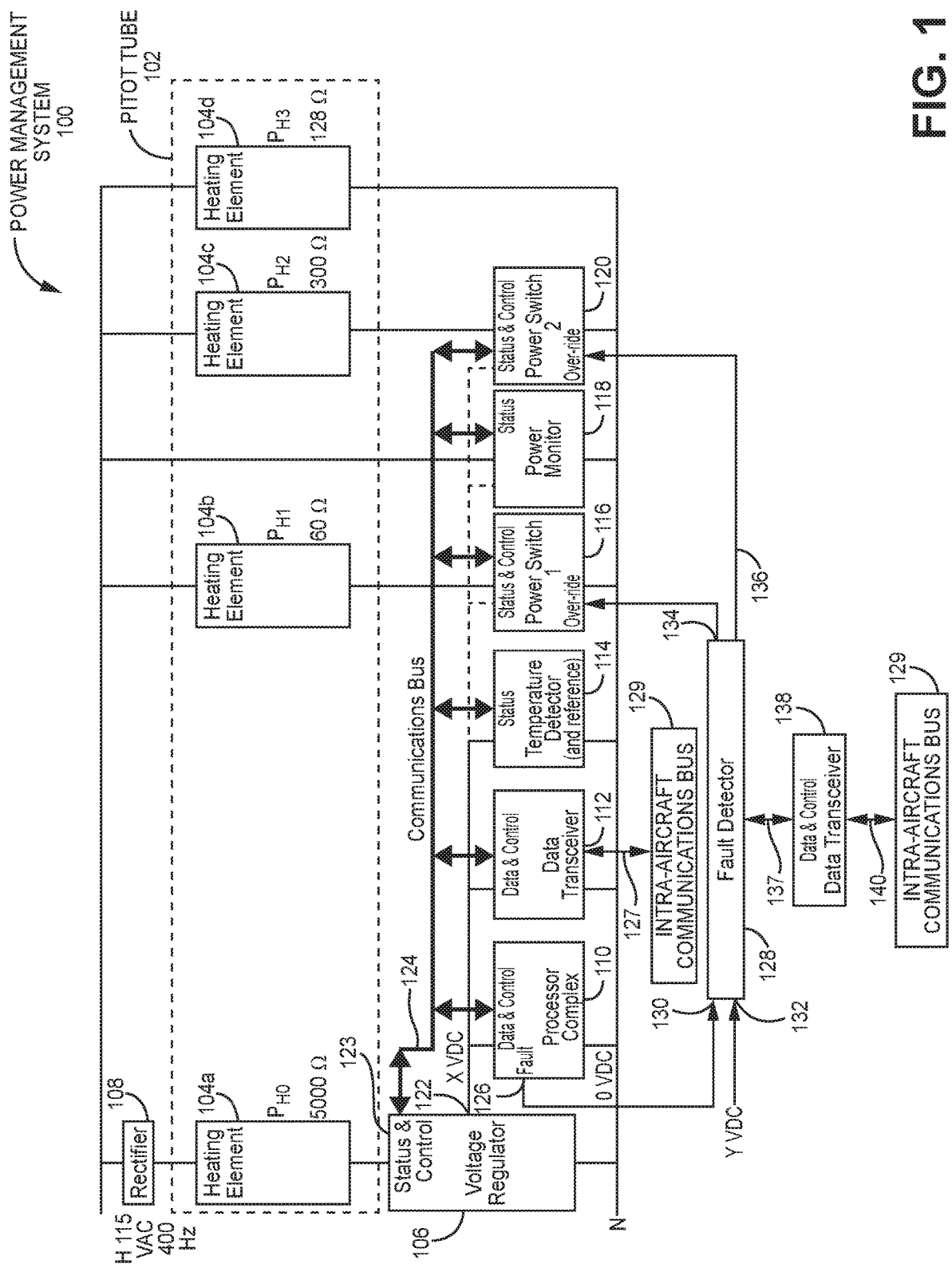
FIG. 1 is a simplified schematic block diagram illustrating a system that can be utilized to implement one example embodiment of the present invention.

FIG. 1 is a simplified schematic block diagram illustrating a system 100, which can be utilized to implement one example embodiment of the present invention. For example, in one embodiment, the system 100 is a power management system for monitoring and controlling the power applied to one or more heating elements in a pitot tube. In some embodiments, the pitot tube is a speed sensor, for example, for a vehicle such as an aircraft. Referring to the exemplary embodiment illustrated in FIG. 1, the system 100 includes a pitot tube 102 (indicated by the dashed lines). One or more heating elements 104a-104d are disposed within the pitot tube 102. Although four heating elements 104a-104d are shown in this illustrative embodiment, other embodiments may include more or less than four heating elements within a pitot tube. For this example embodiment, the nominal resistance of the first heating element 104a is 5 kΩ, the nominal resistance of the second heating element 104b is 60Ω, the nominal resistance of the third heating element 104c is 300Ω, and the nominal resistance of the fourth heating element 104d is 128Ω. In other embodiments, the heating elements utilized in a particular pitot tube may have different resistances than the resistances depicted in this illustrative embodiment.

For this embodiment, system 100 also includes a voltage regulator 106 electrically coupled to a first input of the first heating element 104a and a neutral line (N), and a voltage rectifier 108 electrically coupled to the second input of the first heating element 104a and a 115 VAC power line (H). The 115 VAC power line (H) is also electrically coupled to an input of each one of the four heating elements 104b-104d. A second input of the fourth heating element 104d is electrically coupled to the neutral line (N). Consequently, for this example embodiment, the voltage regulator 106 and the voltage rectifier 108 can create a regulated (stable) DC voltage (e.g., X VDC), as described in detail below, delivered to the control components of system 100. Notably, for this example embodiment, the voltage regulator 106 and rectifier 108 are designed to be fault tolerant and thereby provide a reliable source of power for each control component 110-120. In this regard, one output 122 of the voltage regulator 106 is electrically coupled to an input (e.g., power in) terminal of each control component 110-120, and thereby provides the regulated DC voltage (e.g., X VDC) to power each control component 110-120. Also, for this example embodiment, a second output 123 (e.g., Status & Control) of the voltage regulator 106 is electrically coupled to a communications bus 124. As such, for this embodiment, each control component 110-120 can transmit and receive status and control data to and from the voltage regulator 106 via the communications bus 124.

For this example embodiment, the control components of system 100 include a processor complex 110, a data transceiver 112, a temperature detector 114, a first power switch 116, a power monitor 118 and a second power switch 120. For example, the processor complex 110 can include a digital logic clock, volatile and non-volatile memory, a digital processor (e.g., central processing unit or CPU, microprocessor or microcontroller and the like), and suitable processor support functions such as, for example, a watchdog timer. For example, the watchdog timer can be utilized to detect and recover from a malfunction of the processor complex 110. During normal operation, the processor (e.g., CPU) regularly resets the watchdog timer to prevent it from elapsing or "timing out." If a processing malfunction occurs, the processor complex 110 asserts a "fault" indication (e.g., signal) at the output 126. The "fault" signal is coupled to a first input 130 of a fault detector 128, which is powered by a regulated voltage (e.g., Y VDC, generally independent of X VDC) applied to a second input 132. In response to receiving a "fault" signal at the input 130, the fault detector 128 generates and transmits a first "over-ride" signal from a first output 134 to an input (e.g., "over-ride 1") of the first power switch 116, and a second "over-ride" signal from a second output 136 to an input (e.g., "over-ride 2") of the second power switch 120. The first "over-ride 1" signal thus over-rides the current status of the first power switch 116 such that the heating element 104b becomes or remains energized. Similarly, the second "over-ride 2" signal over-rides the current status of the second power switch 120 such that the heating element 104c becomes or remains energized. Furthermore, for this embodiment, the fault detector 128 also transmits a "fault" indication or signal via a data communication line 137 to a data transceiver 138 which, in turn, transmits the "fault" indication or signal via a data communication line 140 to the (e.g., intra-aircraft) communications bus 129. For example, in one embodiment, the communications bus 129 can be operated in accordance with an existing civil aviation (e.g., ARINC 429) or military aviation (e.g., MIL STD 1553) communications protocol.

In one embodiment, the processor complex 110 also provides static and dynamic compensation for the air speed data transmitted by the pitot tube 102, for example, on the aircraft involved. As such, the processor complex 110 can be utilized to optimize the performance and enhance the MTBF of the pitot tube by "intelligently" controlling the energizing and de-energizing of the heating elements 104a-104d in response to (or even in advance of) exposure to the aircraft's environment inflight or on the ground. The data transceiver 112 is configured to couple data and control information to and from the communications bus 124 from and to the intra-aircraft communications bus 129 via the communications link 127. As such, the data transceiver 112 enables intra-aircraft communications. For example, in one embodiment, the intra-aircraft communications could utilize the existing "Internet of Things" (IoT) communications protocol to provide analytic insight and trending information to the crews, maintenance personnel, manufacturers and/or regulatory agencies involved.

The temperature detector 114 tracks the status of the heating elements 104a-104d and thereby provides an estimate of the temperature of the pitot tube 102. Notably, the primary function of the pitot tube 102 is to provide static air pressure information to an air data computer on the aircraft involved. The function of the temperature detector 114 is to help control and prevent the formation of ice on the pitot tube 102 so that the pitot tube can continue to provide the static air pressure information to the air data computer, which in turn compensates for other factors and thereby determines the airspeed of the aircraft involved.

The first power switch 116 and the second power switch 120 are controlled by the processor complex 110 via the communications bus 124 to energize or de-energize the respective heating element 104b, 104c. In turn, the status (e.g., energized or de-energized) of each power switch 116, 120 is provided back to the processor complex 110 via the communications bus 124. As described above, the fault detector 128 provides a highly reliable, fail-safe over-ride functionality that can energize each power switch 116, 120 and thereby maintain heating to de-ice the pitot tube 102 (e.g., if a processing fault is detected). The power monitor 118 is coupled across the heating elements 104a-104d to monitor the total output power of the heating elements 104a-104d. For example, in one embodiment, the power monitor 118 can be utilized to detect a half-wave power signature across the heating elements, which can indicate that the aircraft is on the ground. In another embodiment, the power monitor 118 can be utilized to identify other power signatures for appropriate processing by the processor complex 110.

Figure 2:
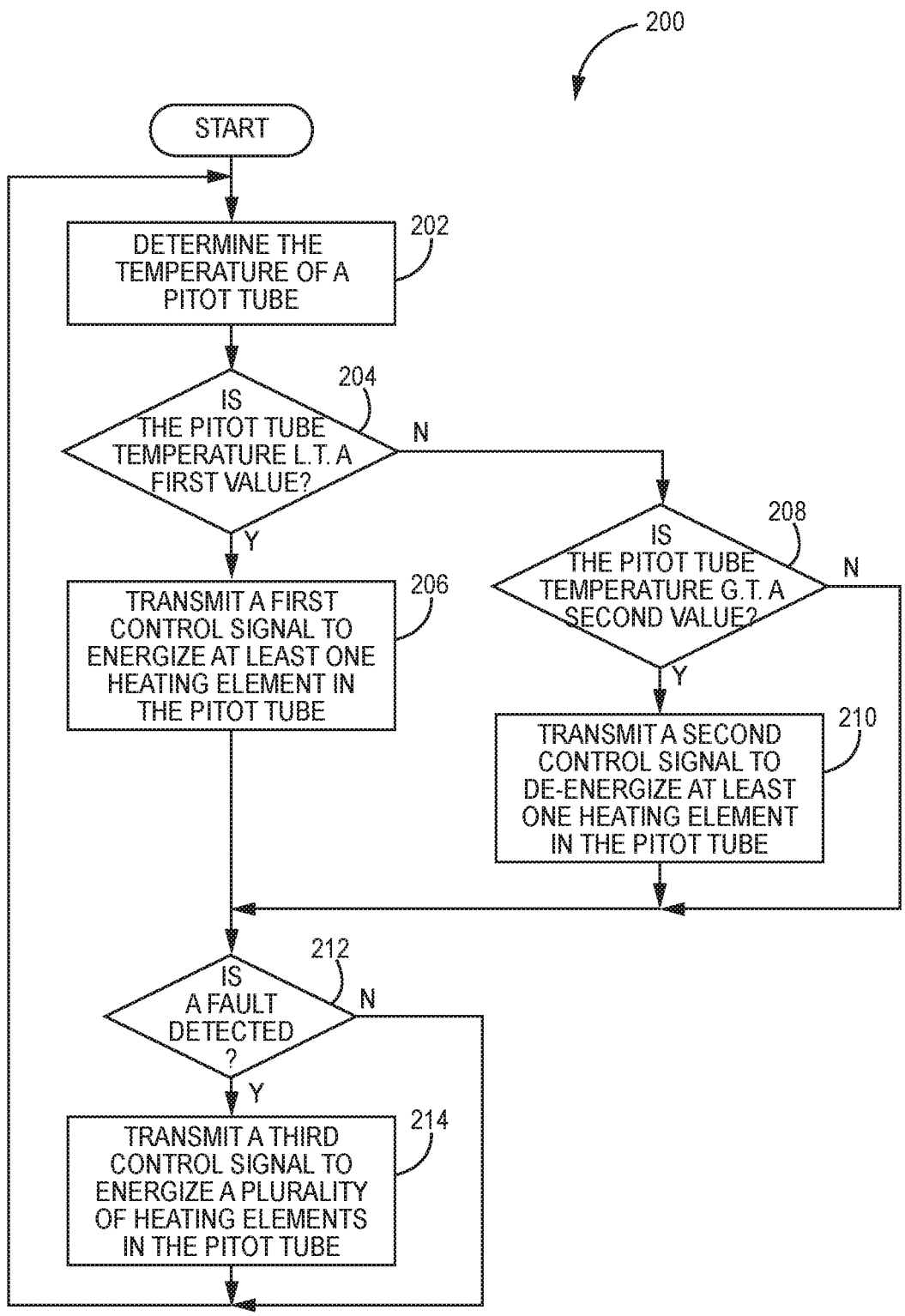
FIG. 2 is a flow diagram illustrating a method that can be utilized to implement one example embodiment of the present invention.

FIG. 2 is a flow diagram illustrating a method 200, which can be utilized to implement one example embodiment of the present invention. Referring to FIG. 2 and the example embodiment illustrated in FIG. 1, the exemplary method 200 begins with the processor complex 110 accessing the communications bus 124 and determining the temperature of the pitot tube 102 (202). For example, in one embodiment, the temperature detector 116 could provide the pitot tube temperature information via the communications bus 124. In a second embodiment, the power monitor 118 could, for example, detect the magnitude of the power being utilized by the heating elements 104a-104d, and the processor complex 110 could utilize that power information to estimate the temperature of the pitot tube 102. Next, the processor complex 110 determines if the temperature of the pitot tube 102 is less than a first value (204). For example, in one embodiment, if the temperature of the pitot tube 102 is determined to be less than the first value, the processor complex 110 could respond by increasing the heating of the pitot tube. In this regard, the processor complex 110 transmits a control signal on the communications bus 124 to energize at least one of the heating elements 104a-104d in the pitot tube 102 (206). For example, the processor complex 110 could energize one or more of the heating elements 104a-104d if the temperature of the pitot tube 102 is deemed to be low enough to require de-icing.

Returning to block (204), if the pitot tube temperature is not less than the first value, then the processor complex 110 determines if the temperature of the pitot tube 102 is greater than a second value (208). For example, in one embodiment, if the temperature of the pitot tube 102 is determined to be greater than the second value, the processor complex 110 could respond by decreasing the heating of the pitot tube. In this regard, the processor complex 110 transmits a control signal on the communications bus 124 to de-energize at least one of the heating elements 104a-104d in the pitot tube 102

(210). For example, the processor complex 110 could de-energize one or more of the heating elements 104a-104d if the temperature of the pitot tube 102 is deemed high enough to be a safety hazard to personnel.

Next, the fault detector 128 determines if a processing "fault" has been detected (212). For example, in the illustrative embodiment depicted in FIG. 1, if the processor complex 110 determines that a processing fault has occurred, then the processor complex 110 transmits a "fault" signal from the output 126, which is received by the fault detector 128 at the input 130. As such, if such a processing fault occurs, the fault detector 128 (e.g., as a fail-safe condition independently of the processor complex 110) can generate a third control signal (e.g., at the outputs 134, 136) that over-rides the current status of the first power switch 116 and the second power switch 120 and, for this embodiment, energizes the heating elements 104b and 104c (214). The flow then returns to (202). Also, if (at 212) the fault detector 128 does not detect a fault, the flow returns to (202).

Figure 3:
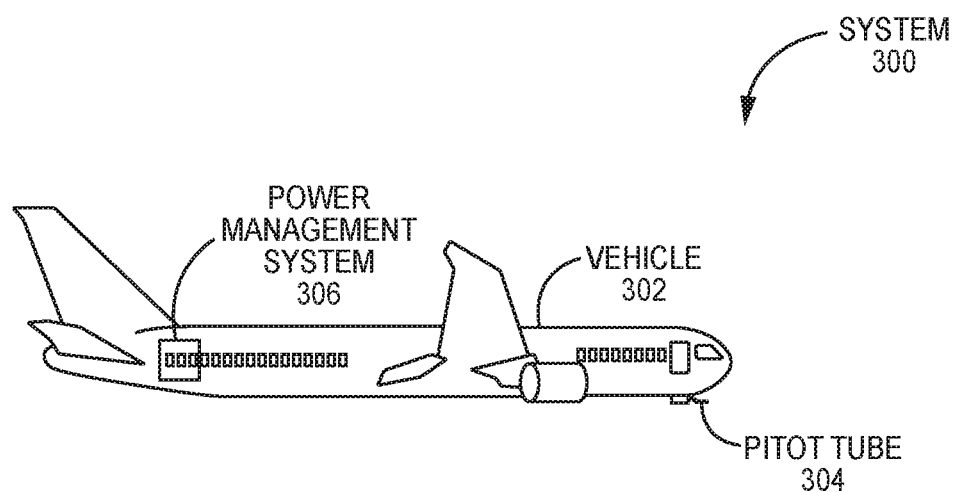
FIG. 3 is a diagram illustrating a system that can be utilized to implement one example embodiment of the present invention.

FIG. 3 is a diagram illustrating a system 300, which can be utilized to implement one example embodiment of the present invention. Referring to FIG. 3, the exemplary system 300 includes a vehicle 302. For the illustrative embodiment depicted in FIG. 3, the vehicle 302 is an aircraft (e.g., general aviation aircraft, military aircraft, unmanned aerial vehicle (UAV) or drone, and the like). However, in a second embodiment, the vehicle 302 could be, for example, a missile, guided bomb, large caliber projectile (e.g., munitions), sea-based vehicle, land-based vehicle, or any other vehicle capable of utilizing one or more pitot tubes to sense, for example, the speed of the vehicle involved.

For this illustrative embodiment, a pitot tube 304 is attached to the underside of the vehicle 302. Although the one pitot tube 304 is shown, more than one pitot tube could be attached to the vehicle 302. For example, the pitot tube 304 could be utilized to sense the static pressure and total pressure in the tube, and a data processor (e.g. air data computer or ADC) onboard the vehicle could convert the sensed static and total pressures to an airspeed value. As such, the pitot tube 304 is utilized to determine the airspeed of the vehicle 302. In any event, one or more additional pitot tubes could be attached to the vehicle 302 in order to provide additional (e.g., backup) airspeed indications for the (e.g., flight) systems and operators of the vehicle 302.

The system 300 also includes a power management system 306. For example, in one embodiment, the power management system 306 can be the power management system 100 illustrated in FIG. 1. Also, for example, the pitot tube 304 can be the pitot tube 102 illustrated in FIG. 1. Accordingly, for this illustrative embodiment, utilizing the data on a suitable communications bus (e.g., the intra-aircraft communications bus 129 in FIG. 1), the power management system 306 monitors and controls the power applied to each one of the heating elements (e.g., 104a-104d in FIG. 1) located in the pitot tube 304. As such, in accordance with the teachings of the present description, the power management system 306 can be utilized to de-ice the pitot tube 304 by controlling the power applied to the heating elements in the pitot tube, and remove the power applied to the heating elements if de-icing is not required (e.g., the vehicle 302 is stationary and/or on the ground).

It should be understood that elements of the above described embodiments and illustrative figures may be used in various combinations with each other to produce still further embodiments which are explicitly intended as within the scope of the present disclosure.

EXAMPLE EMBODIMENTS

Example 1 includes a power management system, comprising: a pitot tube; one or more heating elements disposed in the pitot tube; one or more power switches, wherein each power switch of the one or more power switches is coupled to a respective heating element and configured to energize or de-energize the respective heating element in response to a control signal; a temperature detector coupled to the pitot tube and configured to determine a temperature of the pitot tube; and a processor complex coupled to the one or more power switches and the temperature detector and configured to output the control signal to energize or de-energize at least one of the heating elements through a respective at least one of the respective one or more power switches in response to at least the determined temperature of the pitot tube or a detection of a fault.

Example 2 includes the power management system of Example 1, further comprising: a data transceiver coupled to at least the processor complex and an intra-aircraft communications bus.

Example 3 includes the power management system of any of Examples 1-2, wherein the pitot tube is attached to a land-based, sea-based or air-based vehicle.

Example 4 includes the power management system of any of Examples 1-3, wherein the pitot tube is attached to an aircraft.

Example 5 includes the power management system of any of Examples 1-4, further comprising a fault detector coupled to the processor complex and configured to control the one or more power switches to energize the respective heating elements if a fault is detected.

Example 6 includes the power management system of any of Examples 1-5, further comprising a power monitor coupled to the processor complex and the one or more heating elements and configured to detect a power signature indicating a status of the vehicle.

Example 7 includes the power management system of any of Examples 1-6, wherein the air-based vehicle is a missile, guided bomb, or large caliber projectile.

Example 8 includes the power management system of any of Examples 1-7, wherein the processor complex, the temperature detector and the one or more power switches are communicatively coupled to each other by a communications bus.

Example 9 includes the power management system of any of Examples 1-8, wherein the processor complex includes a fault indication output coupled to an input of a fault detector.

Example 10 includes the power management system of any of Examples 1-9, further comprising a second data transceiver coupled to a fault detector and the intra-aircraft communications bus.

Example 11 includes a method, comprising: determining a temperature of a pitot tube; if the temperature of the pitot tube is less than a first value, transmitting a first control signal to energize at least one heating element in the pitot tube; if the temperature of the pitot tube is not less than the first value, determining if the temperature of the pitot tube is greater than a second value; and if the temperature of the pitot tube is greater than the second value, transmitting a second control signal to de-energize at least one heating element in the pitot tube.

Example 12 includes the method of Example 11, further comprising: determining if a processor fault is detected; and if a processor fault is detected, transmitting a third control signal to energize a plurality of heating elements in the pitot tube.

Example 13 includes the method of any of Examples 11-12, wherein if the temperature of the pitot tube is less than the first value, transmitting the first control signal to energize a plurality of heating elements in the pitot tube.

Example 14 includes the method of any of Examples 12-13, wherein the transmitting the third control signal comprises over-riding a status of at least one power switch associated with a heating element in the pitot tube and energizing the heating element in the pitot tube.

Example 15 includes the method of any of Examples 12-14, wherein if the processor fault is detected, transmitting a signal indication of the processor fault on an intra-aircraft communications bus.

Example 16 includes the method of any of Examples 11-15, wherein the determining the temperature of the pitot tube comprises a temperature detector associated with the pitot tube determining the temperature of the pitot tube and coupling the determined temperature to a processor complex associated with the temperature detector and the pitot tube.

Example 17 includes a system, comprising: a vehicle; a pitot tube attached to the vehicle; and a power management system coupled to the pitot tube, wherein the power management system comprises: one or more heating elements disposed in the pitot tube; one or more power switches, wherein each power switch of the one or more power switches is coupled to a respective heating element and configured to energize or de-energize the respective heating element in response to a control signal; a temperature detector coupled to the pitot tube and configured to determine a temperature of the pitot tube; and a processor complex coupled to the one or more power switches and the temperature detector and configured to output the control signal to energize or de-energize at least one of the heating elements through a respective at least one of the respective one or more power switches in response to at least the determined temperature of the pitot tube or a detection of a fault.

Example 18 includes the system of Example 17, wherein the vehicle comprises an aircraft.

Example 19 includes the system of any of Examples 17-18, wherein the pitot tube is communicatively coupled to the power management system via a communications bus.

Example 20 includes the system of any of Examples 17-19, wherein the power management system further comprises a fault detector coupled to the processor complex and configured to control the one or more power switches to energize the respective heating elements if a fault is detected.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A power management system, comprising:
   a pitot tube;
   one or more heating elements disposed in the pitot tube;
   one or more power switches, wherein each power switch of the one or more power switches is coupled to a respective heating element and configured to energize or de-energize the respective heating element in response to a control signal;
   a temperature detector coupled to the pitot tube and configured to determine a temperature of the pitot tube;
   a fault detector having an output coupled to an input of the one or more power switches; and
   a processor complex coupled to the one or more power switches and the temperature detector and configured to output the control signal to energize or de-energize at least one of the one or more heating elements through a respective at least one of the respective one or more power switches in response to at least the determined temperature of the pitot tube,
   wherein the fault detector is configured to generate and transmit over-ride signals to the one or more power switches when a fault indication is received so that the respective heating element becomes or remains energized,
   wherein the fault detector is coupled to the processor complex and is configured to control the one or more power switches to energize the respective one of the one or more heating elements if a fault is detected.

2. The power management system of claim 1, further comprising:
   a data transceiver coupled to at least the processor complex and an intra-aircraft communications bus.

3. The power management system of claim 1, wherein the pitot tube is configured to be attached to a land-based, sea-based or air-based vehicle.

4. The power management system of claim 1, wherein the pitot tube is configured to be attached to an aircraft.

5. The power management system of claim 1, wherein the fault detector is coupled to the processor complex and further configured to control the one or more power switches to energize the respective heating element if a processing malfunction occurs in the operation of the processor complex.

6. The power management system of claim 1, further comprising a power monitor coupled to the processor complex and the one or more heating elements and configured to detect a power signature indicating a status of a vehicle.

7. The power management system of claim 3, wherein the pitot tube is configured to be attached to a missile, guided bomb, or projectile.

8. The power management system of claim 1, wherein the processor complex, the temperature detector and the one or more power switches are communicatively coupled to each other by a communications bus.

9. The power management system of claim 1, wherein the processor complex includes a fault indication output coupled to an input of the fault detector, wherein the fault detector is configured to detect a fault in the processor complex.

10. The power management system of claim 2, further comprising a second data transceiver coupled to the fault detector and the intra-aircraft communications bus.

11. A method, comprising:
    determining a temperature of a pitot tube;
    if the temperature of the pitot tube is less than a first value, transmitting a first control signal to energize at least one heating element in the pitot tube;
    if the temperature of the pitot tube is not less than the first value, determining if the temperature of the pitot tube is greater than a second value;
    if the temperature of the pitot tube is greater than the second value, transmitting a second control signal to de-energize the at least one heating element in the pitot tube;

if a fault is detected, transmitting a third control signal to over-ride a status of at least one power switch associated with the at least one heating element in the pitot tube, and energizing the at least one heating element in the pitot tube;

determining if a processor fault is detected; and if a processor fault is detected, transmitting the third control signal to energize the at least one respective heating element.

12. The method of claim 11, wherein if the temperature of the pitot tube is less than the first value, transmitting the first control signal to energize a plurality of heating elements in the pitot tube.

13. The method of claim 11, wherein if the processor fault is detected, transmitting a signal indication of the processor fault on an intra-aircraft communications bus.

14. The method of claim 11, wherein the determining the temperature of the pitot tube comprises a temperature detector associated with the pitot tube determining the temperature of the pitot tube and coupling the determined temperature to a processor complex associated with the temperature detector and the pitot tube.

15. A system, comprising:
a vehicle;
a pitot tube attached to the vehicle; and
a power management system coupled to the pitot tube, wherein the power management system comprises:
one or more heating elements disposed in the pitot tube;
one or more power switches, wherein each power switch of the one or more power switches is coupled to a respective heating element and configured to energize or de-energize the respective heating element in response to a control signal;
a temperature detector coupled to the pitot tube and configured to determine a temperature of the pitot tube;
a fault detector having an output coupled to an input of the one or more power switches; and
a processor complex coupled to the one or more power switches and the temperature detector and configured to output the control signal to energize or de-energize at least one of the heating elements through a respective at least one of the respective one or more power switches in response to at least the determined temperature of the pitot tube,
wherein the fault detector is configured to generate and transmit over-ride signals to the one or more power switches when a fault indication is received so that the respective heating element becomes or remains energized,
wherein the fault detector is coupled to the processor complex and is configured to control the one or more power switches to energize the respective one of the one or more heating elements if a fault is detected.

16. The system of claim 15, wherein the vehicle comprises an aircraft.

17. The system of claim 15, wherein the pitot tube is communicatively coupled to the power management system via a communications bus.

18. The system of claim 15, wherein the fault detector is configured to control the one or more power switches to energize the respective heating element if a processing malfunction occurs in the operation of the processor complex.

* * * * *